United States Patent [19]

Moore

[11] Patent Number: 5,660,767

[45] Date of Patent: Aug. 26, 1997

[54] PACKING ELEMENT

[75] Inventor: Frank D. Moore, Tallmadge, Ohio

[73] Assignee: Norton Chemical Process Products Corp., Worcester, Mass.

[21] Appl. No.: 627,848

[22] Filed: Apr. 3, 1996

[51] Int. Cl.⁶ ........................................ B01F 3/04
[52] U.S. Cl. ........................... 261/94; 261/DIG. 72
[58] Field of Search ...................... 261/94, DIG. 72, 261/98

[56] References Cited

U.S. PATENT DOCUMENTS

| | | | |
|---|---|---|---|
| 1,725,429 | 8/1929 | Van Schaack, Jr. | 261/DIG. 72 |
| 3,430,934 | 3/1969 | Weishaupt | 261/DIG. 72 |
| 4,067,936 | 1/1978 | Ellis et al. | 261/DIG. 72 |
| 4,197,264 | 4/1980 | Degg et al. | 261/98 |
| 4,576,763 | 3/1986 | Nutter | 261/DIG. 72 |
| 5,304,328 | 4/1994 | Dolan | 261/94 |
| 5,314,645 | 5/1994 | Rukovena | 261/DIG. 72 |

Primary Examiner—Tim R. Miles
Attorney, Agent, or Firm—David Bennett

[57] ABSTRACT

The invention provides highly deformation resistant Lessing rings made in two parts. The first part comprises a metal strip bent into a ring shape with the contacting ends provided with projections and indentations which fit together to form a complete ring. The ends are held together using an anchor strut which has projecting tabs at both ends. The tabs fit into cooperating slots located in the projections at the ends of the bent strip and at the midpoint of the bent metal strip. The tabs are bent over to locate all parts rigidly in place.

4 Claims, 1 Drawing Sheet

PACKING ELEMENT

BACKGROUND OF THE INVENTION

This invention relates to packing elements use in mass transfer and direct heat transfer applications and specifically to packing elements of a generally cylindrical shape, such as Lessing rings.

Such elements are used in reactors where liquids and gases are contacted so as to bring about a reaction, heat transfer, solution or dissolution operations by intimately contacting two flowing fluids. As a consequence they have shapes designed to maximize surface area while retaining dimensional stability such they do not collapse or become crushed during use. One means of achieving this end is to form the rings from cylindrical metal blanks, and providing internal structure by a variety of suitable techniques.

It is however desirable to have a structure that is easily produced to a standard design in large volumes. To satisfy these requirements the elements are often stamped out of a flat metal plate intended to be bent into a cylindrical shape. One type of ring of this type is the so-called Lessing ring in which a metal strip is bent into a cylindrical shape and one end of the strip is bent inwardly along a chord of the cross-section of the cylinder.

In order for the ring to maintain its shape after it has been formed it must be made from a material with properties of high malleability, high elongation, (that is greater than about 30%) and relatively low yield stress and/or high modulus of elasticity. Examples of such materials include mild carbon steel, 304 stainless steel and the like. Elongation, Yield Stress and Modulus of Elasticity are all measured by the technique shown in ASTM E8. In the context of this invention a "high" yield stress is understood to be a value of 290 mPa or more, while a "low" yield stress is 260 mPa or less. Likewise a "high" modulus of elasticity is one with a value of 170 GPa or more and a "low" value is below 170 GPa.

If an attempt is made to make a ring from a low malleability/low elongation (that is, less than about 20%) and high yield stress material, the ring will spring back after formation leaving a large gap in the ring. Examples of such materials are zirconium and titanium.

In order to retain the closed ring structure it is possible to use thicker gauge metal strip. This however becomes very costly and adds large weight penalties to the product. Alternatively it is necessary to develop a design with a mechanical closure. Such a design is taught in U.S. Pat. No. 5,304,328.

One mechanical solution has been to use a pair of bridging members to hold two cooperating semicylindrical pieces together as is described in U.S. Pat. No. 4,197,264. This has a significant disadvantage in that the production process requires the combination of four separate components to make the final product.

As indicated above, another solution proposed in U.S. Pat. No. 5,304,328 provides a metal strip having first and second end zones adjacent the ends thereof, adapted to be bent into a generally cylindrical form to produce a packing element; wherein the first end zone is provided with a bend such that, when the element is formed, the end of the strip is within the cylinder and the first end zone is further provided, in the vicinity of the bend, with one or more slots; and in which the second end zone is provided with one or more tabs projecting from the end of the strip and adapted to engage with the slots in the first end zone so as to lock the ends together when the strip is formed into a cylindrical packing element.

While effective for many applications the above design is rather difficult to make consistently.

The present invention provides a packing adapted for use in conditions involving extreme conditions of heat and pressure without suffering distortion or dislocation while continuing to supply effective mass transfer functions which is comparatively easy to manufacture.

DESCRIPTION OF THE INVENTION

The present invention provides a packing element in the form of a metal ring comprising:

a) a metal strip having first and second opposed ends bent so as to bring first and second ends together, each of said ends being provided with cooperating projections and indentations such that when the strip is bent to bring the first and second ends together, the projections in each end each fit into cooperating indentations in the other end, the strip being further provided with at least one midpoint-slot at a point about midway between the ends, and end-slots in at least some of said projections; and b) an anchoring strut having first and second ends provided with tabs at said first end adapted to fit into the midpoint-slots and tabs at said second end adapted to fit into the end-slots, the tabs being deformed after insertion into the slots so as to hold the ends of the strip together and resist deformation.

The strip preferably has the same number of slots as the anchoring strut has tabs and the tabs and slots each preferably have dimensions such that the tabs are long enough to give a firm anchorage while fitting easily into the slots.

The strip preferably has the same number of projections and indentations on each end with both projections and indentations having the same spatial dimensions. The most straightforward design provides one projection and one recess on each end so proportioned that the projection and the recess on the first end are exactly the dimensions of the recess and projection respectively on the second end such that when brought together, a substantially continuous ring is obtained. More cooperating pairs of indentations and projections can be provide if desired but are not usually necessary. In this preferred design, the opposed projections each have at least one slot adapted to accommodate tabs on the cooperating anchoring strut which would be used to keep the ends together when the tabs are bent over after insertion through the slots.

The strip is also provided with at least one midpoint-slot and the anchoring strut has a corresponding number of cooperating tabs adapted to project through the midpoint-slot(s) and be bent over to anchor that end of the anchoring strut in place. The midpoint location of the slot can be displaced by a small amount from the exact center without departing from the invention. It is however necessary that it be effective in substantially preventing the flattening of the ring under normal operating conditions.

The anchoring strut can have any suitable configuration adapted to maintain the shape of the ring including an H shape with the vertical members bearing the tabs and the cross member having a length appropriate to the diameter of the ring. More preferably the anchoring strut is a plate with a length approximately equal to the diameter of the ring and has tabs located at the ends of the strip and with the width of the strut being approximately equal to the axial length of the ring.

The metal of which the ring, including the anchoring strut, is formed is preferably highly corrosion resistant. It is preferably also formed of a metal with a low malleability and low elongation so as to be very difficult to deform from the ring shape once this has been formed and anchored in place. Suitable metals would include titanium and zirconium.

The dimensions of the ring can be selected with a high degree of flexibility depending on the application. Generally however rings with a diameter of from 0.6 to 10 cm, and particularly from 0.9 to 3.8 cm are most useful. The axial length of the rings are usually comparable to the diameter and preferred lengths of from 0.6 to about 10, and more preferably from 0.9 to 3.8 cm are used. The gauge of the metal strip and the anchoring strut can be chosen to suit the application. Usually however the gauge is from about 0.1 mm to about 3.0 mm and more preferably from 0.25 to 1.3 mm.

The ring according to the invention is preferably made by cutting a metal strip to the appropriate shape and the coiling it into an initial roll with a much smaller radius of curvature than the desired ring and then allowing it to spring back to the point at which only a small amount of overlap remains. The ring is then mechanically spread to form the final ring shape which is then locked in place using an anchoring strut having tabs located in a slot at the midpoint of the metal strip and in slots located in the projections on each end of the metal strip. The tabs may be retained in position by bending or twisting the tabs to prevent easy release from the slots. The low elongation of the metal prevents the further deformation of the ring.

DRAWINGS

The attached drawings are described as follows.

DESCRIPTION OF PREFERRED EMBODIMENTS

Figure 1A:
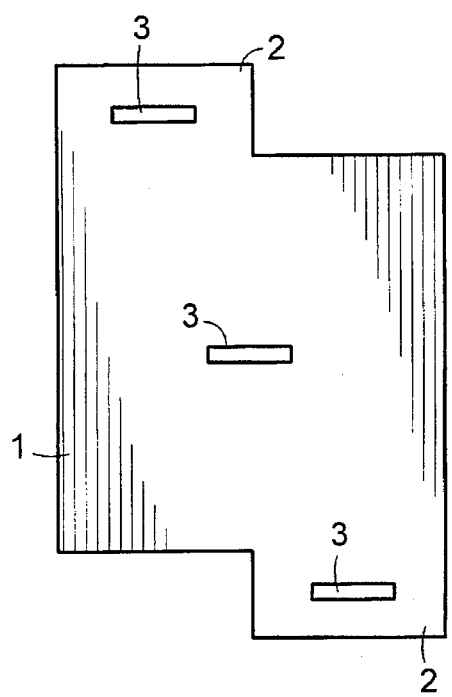
FIG. 1 is a plan view of a metal strip adapted for the production of a Lessing ring, (before it is bent into a cylindrical shape, and showing the projections, indentations and slots), and an anchoring strut with the projecting tabs adapted for use with the strip when bent to form a ring.

The invention will now be further described with specific reference to the embodiment illustrated in the Drawings which is for illustration only and is intended to imply no limitation on the essential scope of the invention.

Figure 1B:
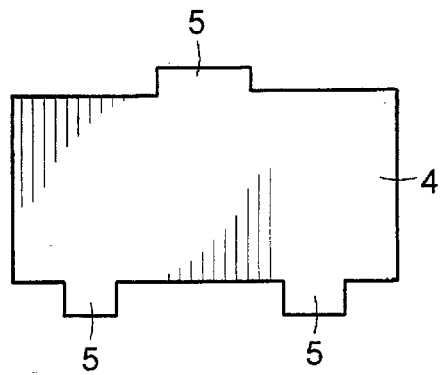

In the Drawings, and referring initially to FIG. 1, a metal strip, 1, is provided at opposed ends with projections, 2. In each projection there is located a slot, 3. A slot is also provided in the body of the strip at a point midway between the ends bearing the projections. A second strip, 4, provides an anchoring strut provided with tabs, 5.

Figure 2:
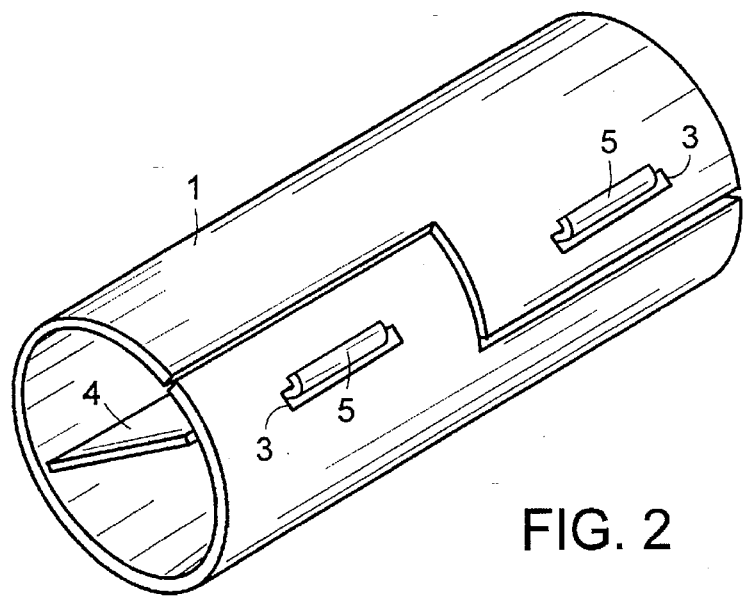
FIG. 2 is perspective view of a Lessing ring made from a strip and strut combination of the present invention as shown in FIG. 1.

FIG. 2 shows the strips illustrated in FIG. 1 assembled into a Lessing ring according to the invention. The metal strip, 1, is bent into a ring structure with the projections, 2, from both ends located adjacent one another. The anchoring strut is fitted within the ring structure such that one tab on the strut is fitted into the midway slot in the bent metal strip to locate that end of the strut in position, and the two tabs at the opposed end of the strut are located in the slots in the adjacent projections and bent over to anchor that end of the strut and the projections on the bent strip into position.

Other types of metal strips suitable for the production of other kinds of cylindrical packing elements could be designed with means for holding the ends together as shown in the above invention.

Metal strips for producing all such cylindrical packing elements, and the packing elements formed therefrom, are understood to be within the purview of this invention.

What is claimed is:

1. A packing element in the form of a metal ring comprising:
   a) a metal strip having first and second opposed ends bent so as to bring first and second ends together, each of said ends being provided with cooperating projections and indentations such that when the strip is bent to bring the first and second ends together, the projections in each end each fit into cooperating indentations in the other end, the strip being further provided with at least one midpoint-slot at a point about midway between the ends, and end-slots in at least one projection on each end of the strip; and
   b) an anchoring strut having first and second ends provided with tabs at said first end adapted to fit into the midpoint-slots and tabs at said second end adapted to fit into the end-slots, the tabs being deformed after insertion into the slots so as to hold the ends of the strip together and resist deformation.

2. A packing element according to claim 1 wherein the metal strip has one projection and one indentation at each of the first and second ends.

3. A packing element according to claim 1 in which the metal from which the ring is made has an elongation below 20%.

4. A packing element according to claim 1 in which the metal is selected from the group consisting of titanium and zirconium.

* * * * *